(12) United States Patent
Trieb

(10) Patent No.: US 6,588,583 B2
(45) Date of Patent: Jul. 8, 2003

(54) CONVEYOR SYSTEM

(75) Inventor: Herbert Trieb, Wolfurt (AT)

(73) Assignee: Innova Patent GmbH, Wolfurt (AT)

( * ) Notice: Subject to any disclaimer, the term of this patent is extended or adjusted under 35 U.S.C. 154(b) by 0 days.

(21) Appl. No.: 10/234,546

(22) Filed: Sep. 4, 2002

(65) Prior Publication Data

US 2003/0051981 A1 Mar. 20, 2003

(30) Foreign Application Priority Data

Sep. 20, 2001 (AT) .......................................... 1501/2001

(51) Int. Cl.⁷ .............................................. B65G 39/20
(52) U.S. Cl. ..................... 198/845; 198/838; 198/860.1
(58) Field of Search ................................ 198/845, 838, 198/860.1, 860.3, 698, 690.2

(56) References Cited

U.S. PATENT DOCUMENTS

| | | | | |
|---|---|---|---|---|
| 768,682 A | * | 8/1904 | Parker | 198/838 |
| 781,138 A | * | 1/1905 | Etcheverry | 198/838 |
| 1,009,264 A | * | 11/1911 | Spadone | 198/838 |
| 3,854,571 A | * | 12/1974 | Siirtola | 198/162 |
| 4,615,434 A | * | 10/1986 | Lachmann | 198/845 |
| 4,674,627 A | * | 6/1987 | Dussan V. Benlcio I. | 198/845 |
| 4,676,367 A | * | 6/1987 | Nolte | 198/821 |
| 5,791,454 A | | 8/1998 | Trieb | |
| 6,039,171 A | * | 3/2000 | Trieb | 198/821 |

FOREIGN PATENT DOCUMENTS

EP 0 745 545 B1 12/1996

* cited by examiner

*Primary Examiner*—Douglas Hess
(74) *Attorney, Agent, or Firm*—Laurence A. Greenberg; Werner H. Stemer; Ralph E. Locher

(57) ABSTRACT

The conveyor system for transporting goods has a conveyor belt to which transversely oriented supporting beams are attached. The system has two support tracks that are arranged at a vertical distance from one another and are each formed by two supporting cables along which rollers that are arranged at the lateral ends of the supporting beams can be moved. The supporting cables are connected to one another by a plurality of retaining frames.

8 Claims, 5 Drawing Sheets

CONVEYOR SYSTEM

BACKGROUND OF THE INVENTION

Field of the Invention

The present invention relates to a conveyor system for transporting goods. The system has a conveyor belt or the like to which supporting beams which are oriented transversely with respect to its direction of movement are attached, and it also has two supporting webs arranged at a vertical distance from one another, are each formed by two supporting cables and along which rollers which are arranged at the lateral ends of the supporting beams can be moved.

In such a conveyor system, which is described in my earlier U.S. Pat. No. 5,791,454 and my European published patent document EP 745 545, it is possible, when there are large bearing distances of the supporting cables and when strong wind forces are acting, for the supporting cables not to have the necessary positional stability with respect to one another but instead change in their position with respect to one another to such a degree that the supporting rollers derail from the supporting cables. As a result, of course, the system is no longer operative.

SUMMARY OF THE INVENTION

It is accordingly an object of the invention to provide a conveyor system, which overcomes the above-mentioned disadvantages of the heretofore-known devices and methods of this general type and which is improved to the extent that satisfactory operation is ensured even under unfavorable wind conditions.

With the foregoing and other objects in view there is provided, in accordance with the invention, a conveyor system for transporting goods, comprising:

a conveyor belt disposed to move along a given transport direction;
  supporting beams connected to the conveyor belt and orientated transversely with respect to the given transport direction, the supporting beams having lateral ends;
  two pairs of supporting cables disposed at a vertical spacing distance from one another and defining two vertically spaced-apart transport tracks;
  rollers disposed at the lateral ends of the supporting beams for rolling on the supporting cables; and
  plurality of retaining frames connecting the supporting cables to one another.

In other words, the objects of the invention are achieved in that the supporting cables are rigidly connected to one another by a multiplicity of retaining frames.

The retaining frames are preferably embodied with two at least approximately vertically oriented beams and with at least two struts which connect the latter to one another and are at least approximately horizontally oriented. The struts are attached to the supporting cables by way of clamps. Here, the at least approximately vertical beams can be connected by further, at least approximately horizontal struts on which guide devices for the conveyor belt are arranged.

According to one preferred embodiment, a cover is attached to the retaining frames, or a housing which encloses the conveyor belt on at least a plurality of sides is attached to the retaining frame.

In addition, the clamps are preferably embodied with a device for boosting the clamping force. Here, the clamps can be embodied with two clamping jaws which can pivot with respect to one another and which are each embodied with a conical, arched or beveled face and to which supporting clips which are embodied with conical faces are assigned, as a result of which the pressing of the clamping jaws against the supporting cables is boosted when the supporting clips are loaded.

In addition, further cables which are also connected to the retaining frames can be provided above the upper pair of supporting cables.

Other features which are considered as characteristic for the invention are set forth in the appended claims.

Although the invention is illustrated and described herein as embodied in a conveyor system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
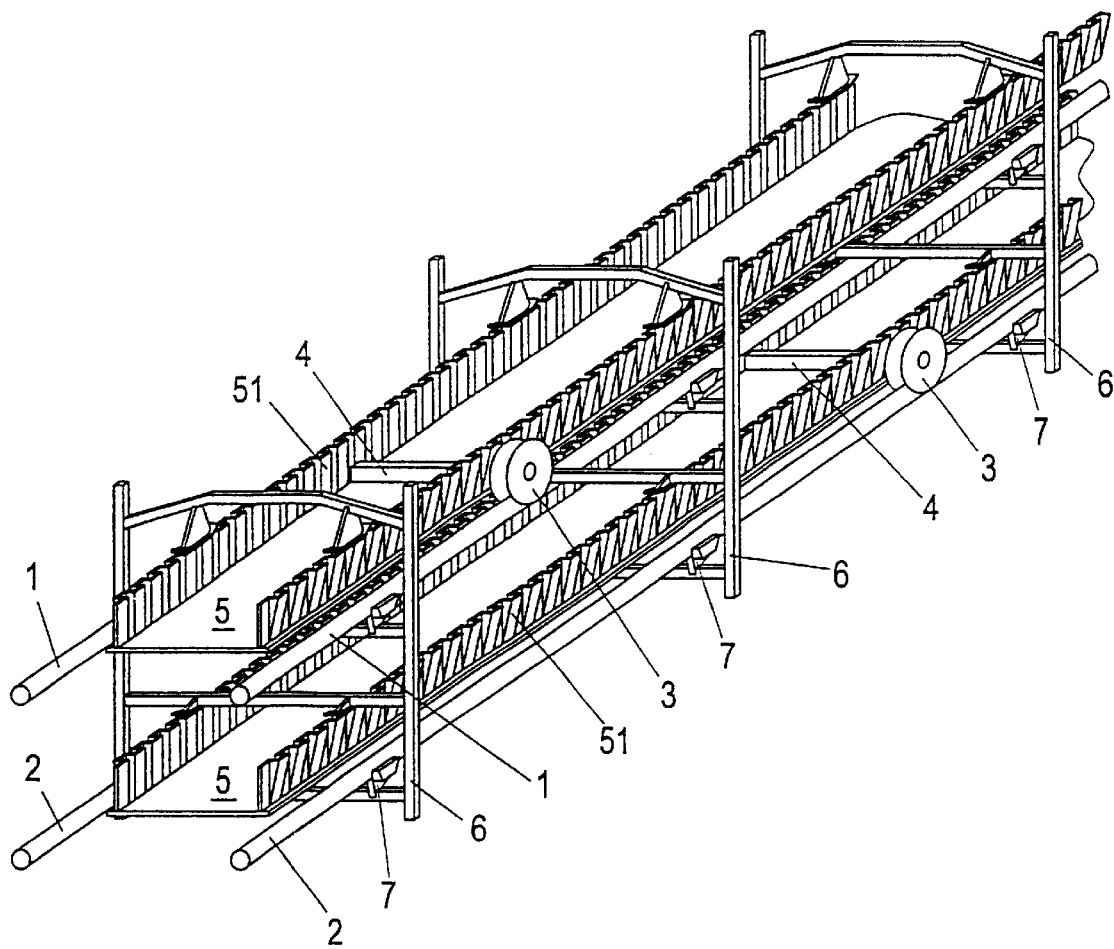
FIG. 1 is a top perspective view of part of a conveyor system according to the invention.
Figure 2:
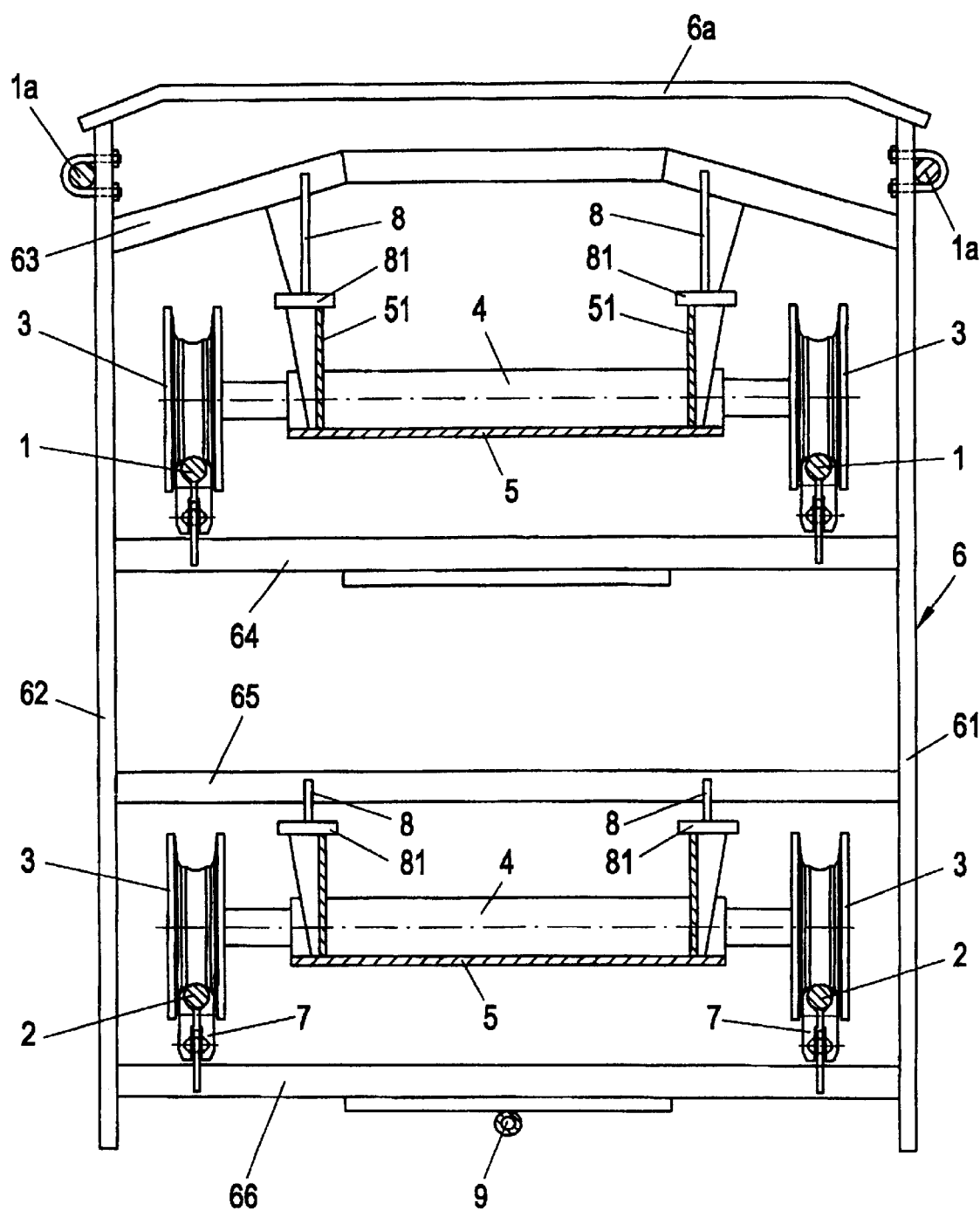
FIG. 2 is a front elevational view of the system of FIG. 1.
Figure 3:
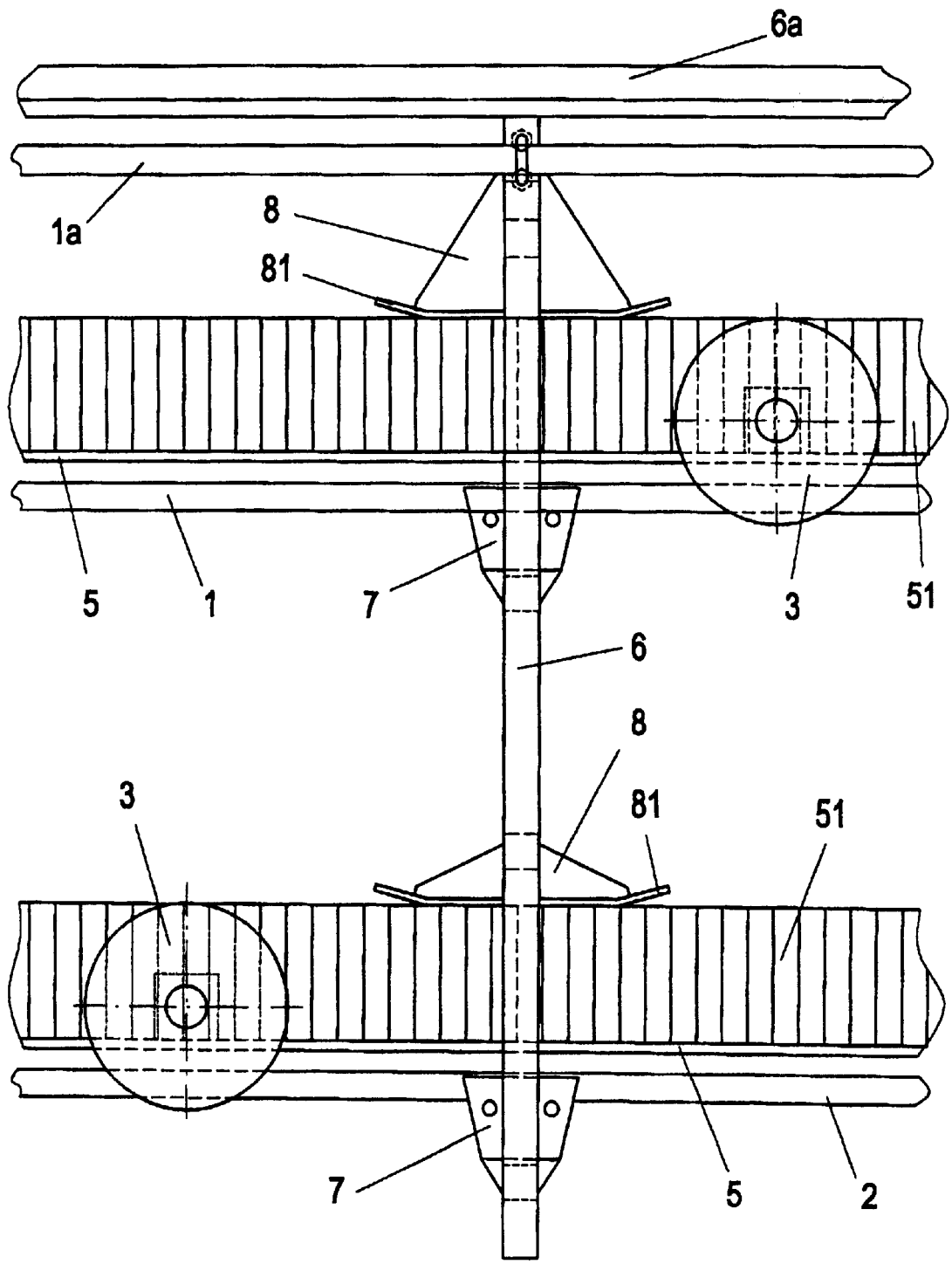
FIG. 3 is a side elevational view of the system of FIG. 1.

Referring now to the figures of the drawing in detail and first, particularly, to FIGS. 1 and 2 thereof, the system according to the invention has two pairs of supporting cables 1 and 2. The pairs of cables 1 and 2 are guided and anchored at a vertical spacing distance from one another to the ends of the system by means of supporting frames. An enclosed conveyor belt 5 can be moved along the cables by means of supporting rollers 3 which are mounted at the lateral ends of supporting beams 4. The conveyor belt 5 is attached to the undersides of the supporting beams 4. The conveyor belt 5 is embodied along its side edges with corrugated edges 51 which are necessary to be able to guide it by means of deflection drums at the two end stations of the system. The system as just described is known from my earlier disclosure.

In order to be able to ensure the positional stability of the supporting cables 1 and 2 with respect to one another, which positional stability is necessary for disruption-free operation of such a system, retaining frames 6 which are arranged at intervals from one another are attached to the supporting cables 1 and 2 by means of clamps 7 which hold the supporting cables 1 and 2 at fixed distances from one another. As the conveyor belt 5 is turned through 180° by means of a turning device in the end regions wherein it is deflected, both strands thereof are directed upward.

As this is clear and in particular from FIG. 2, the retaining frames 6 are composed of vertical beams 61 and 62 which are connected to one another by way of approximately horizontal struts 63, 64, 65 and 66. The retaining frames 6 are attached to the supporting cables 1 and 2 by means of clamps 7 to which the struts 64 and 66 are attached. Carriers 8 for guide faces 81 which serve to hold the corrugated edges 51 in position and at the same time to prevent the derailing of the supporting rollers 3 project downward from the struts 63 and 65.

The supporting cables 1 and 2 are held at the given vertical and horizontal distances from one another by means of the retaining frames 6, as a result of which disruption-free movement of the conveyor belt 5 is ensured under any operating conditions. In addition, a cover 6a or a housing for the system can be arranged on the retaining frames 6. In addition, the retaining frames 6 can also serve as carriers for lines 9 or the like.

Figure 4:
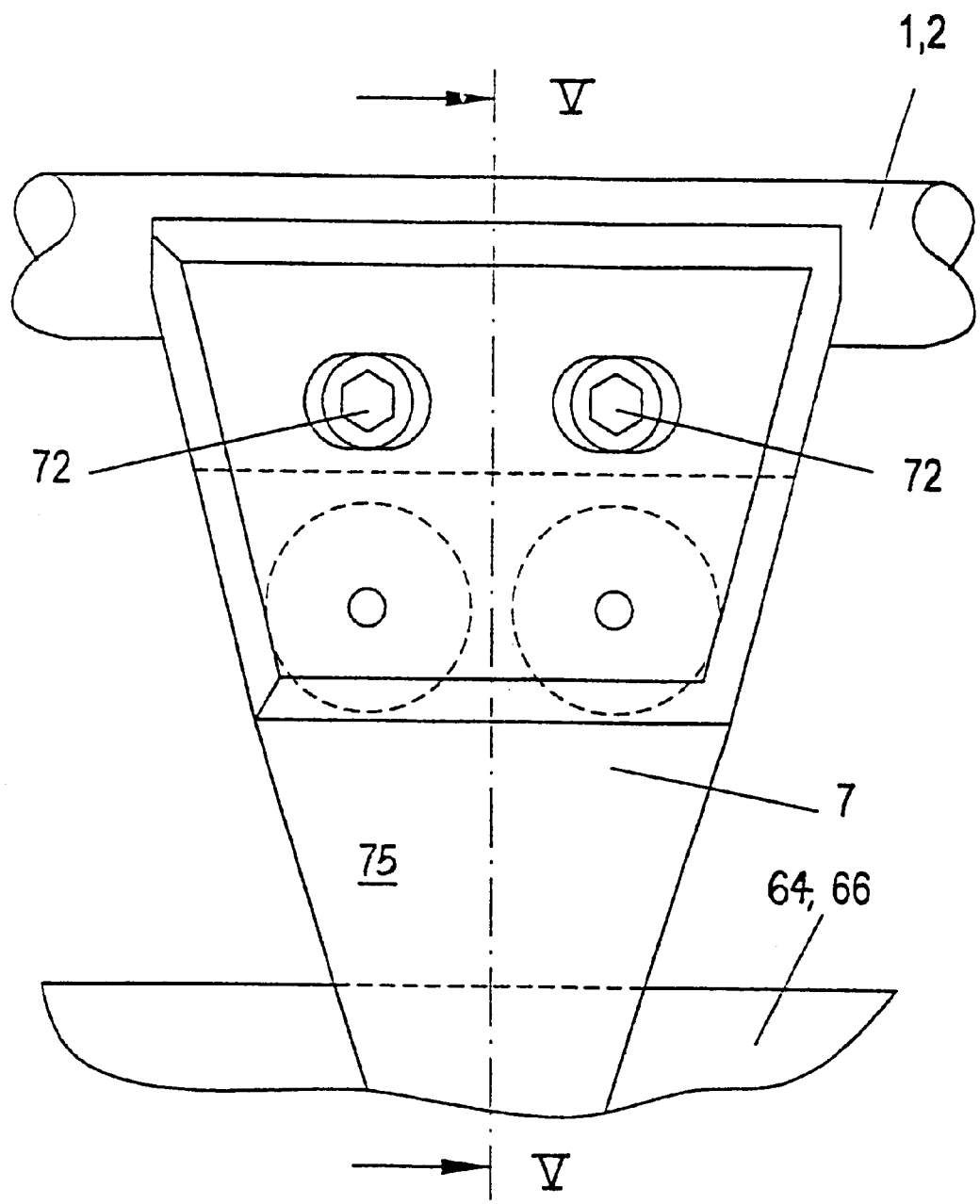
FIG. 4 is a side view of an attachment clamp.
Figure 5:
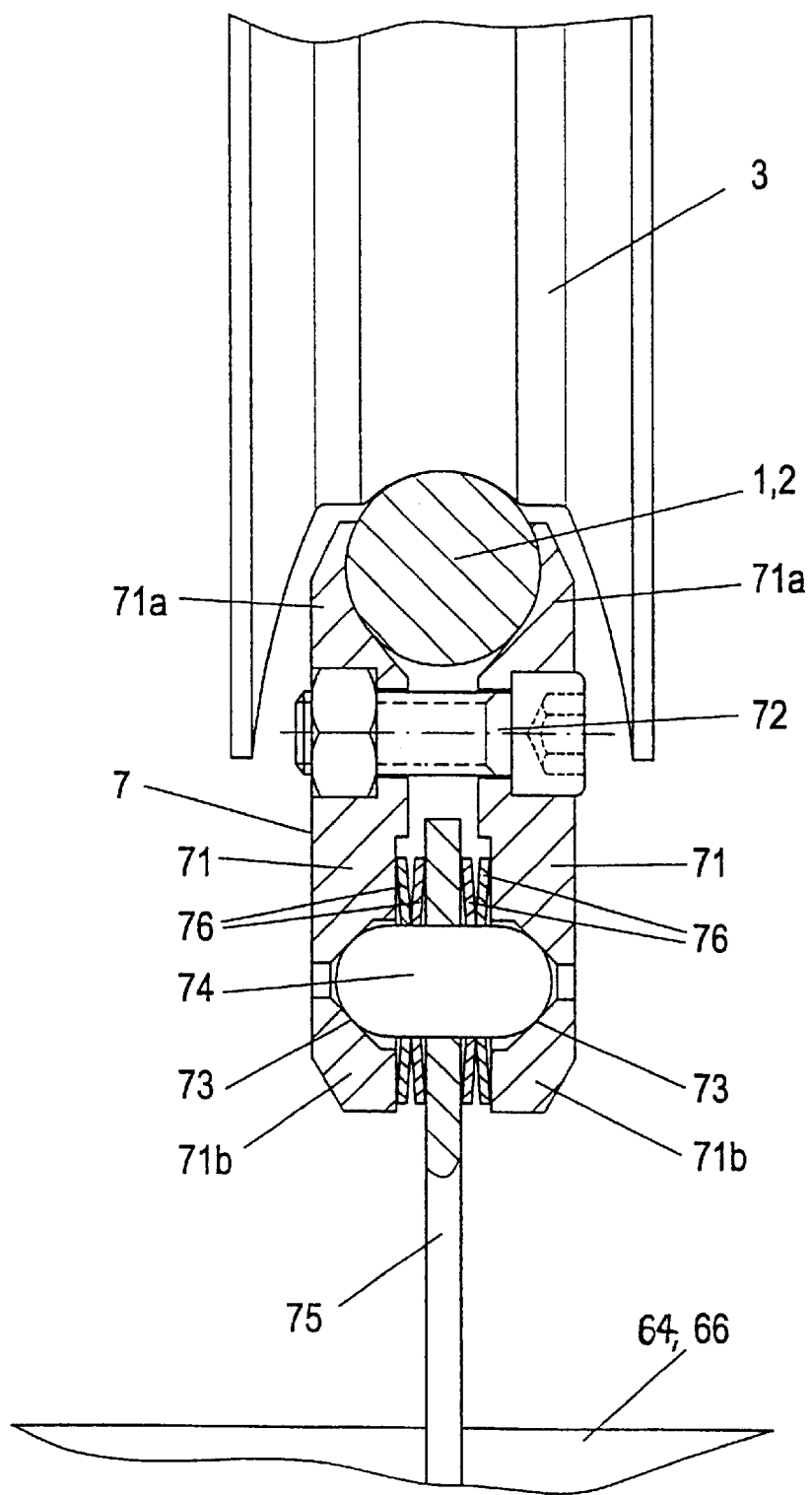
FIG. 5 is a section through the attachment clamp taken along the line V—V in FIG. 4, and viewed in the direction of the arrows.

The construction and function of the clamps 7 will now be explained with reference to FIGS. 4 and 5. The clamps 7 are composed of two clamping jaws 71 whose upper parts 71a bear against the supporting cables 1, 2. However, as the rollers 3 run on the supporting cables 1, 2, the clamping jaws 71 can bear only against the side faces of the supporting cables 1, 2. Below the upper parts 71a of the clamping jaws 71, they are connected to one another by means of two bolts 72 in such a way that they can be pivoted slightly toward one another about an axis running in the direction of the supporting cable 1, 2.

In the lower region 71b, cutouts 73 are provided in the clamping jaws 71, which cutouts 73 are embodied on their underside with conical, arched or oblique faces. In these cutouts 73 there are supporting bodies 74 which are embodied with conical faces and to which supporting clips 75 which are connected to the struts 64 and 66 are attached. In addition, two groups of plate springs 76 by which the upper parts 71a of the clamping jaws 71 are pressed against the supporting cables 1, 2 are arranged between the supporting clips 75 and the clamping jaws 71. Changes in the diameter of the supporting cables 1 and 2 are absorbed by these plate springs 76.

As soon as a tensile force is exerted on the supporting bodies 74 by the retaining frames 6 via the supporting clips 75, the lower regions 71b of the clamping jaws 71 are spread even further apart from one another, as a result of which the clamping force exerted on the supporting cables 1, 2 by the upper jaw parts 71a is increased. This ensures that the clamps 7 are prevented from coming away from the supporting cables 1, 2 when there is boosted loading of the clamps 7 by the supporting frames 6.

The retaining frames 6 thus reliably prevent derailing of the rollers 3. In addition, the retaining frames 6 can serve as carriers for a cover 6a or a housing as well as for cables, pipes or the like. In order to increase the supporting force, at least one further pair of cables 1a may also be provided, said pair of cables 1a being located above the supporting cables 1 and the supporting frames 6 being also attached to them. This further pair of cables 1a may absorb some of the loads. In addition, this pair of cables 1a brings about a further positional stabilization of the supporting cables. Finally, this further pair of cables 1a can serve as a carrier for the cover 6a or for the housing.

I claim:

1. A conveyor system for transporting goods, comprising:

a conveyor belt disposed to move along a given transport direction;

supporting beams connected to said conveyor belt and orientated transversely with respect to the given transport direction, said supporting beams having lateral ends;

two pairs of supporting cables disposed at a vertical spacing distance from one another and defining two vertically spaced-apart transport tracks;

rollers disposed at said lateral ends of said supporting beams for rolling on said supporting cables; and a plurality of retaining frames connecting said supporting cables to one another.

2. The conveyor system according to claim 1, wherein said retaining frames are formed of two substantially vertical beams, and at least two substantially vertical struts connecting said vertical beams to one another, and clamps attaching said struts to said supporting cables.

3. The conveyor system according to claim 2, which comprises further, substantially horizontal struts connecting said at least substantially vertical beams, said further struts carrying guide devices for said conveyor belt.

4. The conveyor system according to claim 2, wherein said clamps include a device for boosting a clamping force thereof.

5. The conveyor system according to claim 4, wherein said clamps are formed with two clamping jaws that are pivotable with respect to one another and are each formed with a formed face selected from the group consisting of conical faces, arched faces, and beveled faces, and wherein supporting clips formed with arched faces are assigned to said formed face, such that a pressing force of said clamping jaws against said supporting cables is boosted when said supporting clips are loaded.

6. The conveyor system according to claim 1, which comprises a cover attached to said retaining frames.

7. The conveyor system according to claim 1, which comprises a housing attached to said retaining frame and enclosing said conveyor belt on more than one side thereof.

8. The conveyor system according to claim 1, which comprises at least one further cable above an upper pair of said supporting cables and connected to said retaining frames.

* * * * *